(12) United States Patent
Kadota

(10) Patent No.: US 10,116,852 B2
(45) Date of Patent: Oct. 30, 2018

(54) CONTROL DEVICE, CONTROL SYSTEM, CONTROL METHOD AND PROGRAM

(71) Applicant: Sony Corporation, Tokyo (JP)

(72) Inventor: Keiichiro Kadota, Chiba (JP)

(73) Assignee: Sony Corporation, Tokyo (JP)

( * ) Notice: Subject to any disclaimer, the term of this patent is extended or adjusted under 35 U.S.C. 154(b) by 39 days.

(21) Appl. No.: 15/308,067

(22) PCT Filed: Jul. 23, 2015

(86) PCT No.: PCT/JP2015/003699
§ 371 (c)(1),
(2) Date: Oct. 31, 2016

(87) PCT Pub. No.: WO2016/027414
PCT Pub. Date: Feb. 25, 2016

(65) Prior Publication Data
US 2017/0054892 A1 Feb. 23, 2017

(30) Foreign Application Priority Data

Aug. 21, 2014 (JP) ................. 2014-168609

(51) Int. Cl.
*H04N 5/232* (2006.01)
*H04N 1/00* (2006.01)
*H04W 4/80* (2018.01)

(52) U.S. Cl.
CPC ..... *H04N 5/23206* (2013.01); *H04N 1/00204* (2013.01); *H04N 5/23203* (2013.01); *H04N 5/23241* (2013.01); *H04N 2201/0055* (2013.01); *H04N 2201/0075* (2013.01); *H04N 2201/0084* (2013.01); *H04N 2201/0096* (2013.01);
(Continued)

(58) Field of Classification Search
CPC .......... H04M 2250/10; H04M 2250/12; H04N 2201/3253; H04N 5/223203; H04N 5/23206; H04N 5/23241; H04W 4/008
See application file for complete search history.

(56) References Cited

U.S. PATENT DOCUMENTS

| 2007/0126883 A1 | 6/2007 | Ishige et al. |
| 2007/0219686 A1* | 9/2007 | Plante .................... G07C 5/008 701/33.4 |
| 2008/0242223 A1 | 10/2008 | Yamada |

(Continued)

FOREIGN PATENT DOCUMENTS

| JP | 2001-326845 A | 11/2001 |
| JP | 2007-256137 A1 | 10/2007 |

(Continued)

OTHER PUBLICATIONS

Press Release, "Sony's New AS20 Action Cam Offers a More Exciting Point of View," by Communications in Digital Cameras, Video Cameras, San Diego, Jul. 31, 2014.

(Continued)

*Primary Examiner* — Amy Hsu
(74) *Attorney, Agent, or Firm* — Michael Best & Friedrich LLP

(57) ABSTRACT

A remote camera control device and method therefor includes a communication circuit that transmits an operation request to an external camera device, and selectively transmits a sensor information to the external camera device.

19 Claims, 8 Drawing Sheets

(52) U.S. Cl.
CPC ............... *H04N 2201/3253* (2013.01); *H04N 2201/3278* (2013.01); *H04W 4/80* (2018.02)

(56) References Cited

U.S. PATENT DOCUMENTS

| | | | |
|---|---|---|---|
| 2009/0315671 A1* | 12/2009 | Gocho | G03B 17/38 340/5.8 |
| 2011/0050926 A1* | 3/2011 | Asano | G06F 21/36 348/211.2 |
| 2012/0287296 A1* | 11/2012 | Fukui | G03B 31/00 348/211.2 |
| 2012/0308081 A1* | 12/2012 | Sato | G01S 5/0252 382/103 |
| 2013/0028586 A1* | 1/2013 | Ide | G03B 15/05 396/303 |
| 2013/0033598 A1* | 2/2013 | Milnes | G01S 19/49 348/144 |
| 2013/0278795 A1* | 10/2013 | Kiyoshige | H04N 5/262 348/231.3 |
| 2014/0072278 A1 | 3/2014 | Kramer et al. | |
| 2016/0028917 A1* | 1/2016 | Wexler | H04N 5/2257 348/169 |

FOREIGN PATENT DOCUMENTS

| | | | |
|---|---|---|---|
| JP | 2007-333711 | A1 | 12/2007 |
| JP | 2007333711 | A * | 12/2007 |
| JP | 2010-258593 | A1 | 11/2010 |
| JP | 2012-119846 | A | 6/2012 |
| WO | WO-2010-005975 | A1 | 1/2010 |

OTHER PUBLICATIONS

Japanese Office Action dated Oct. 24, 2017 for corresponding Japanese Application No. 2014-168609.

\* cited by examiner

[Fig. 1]
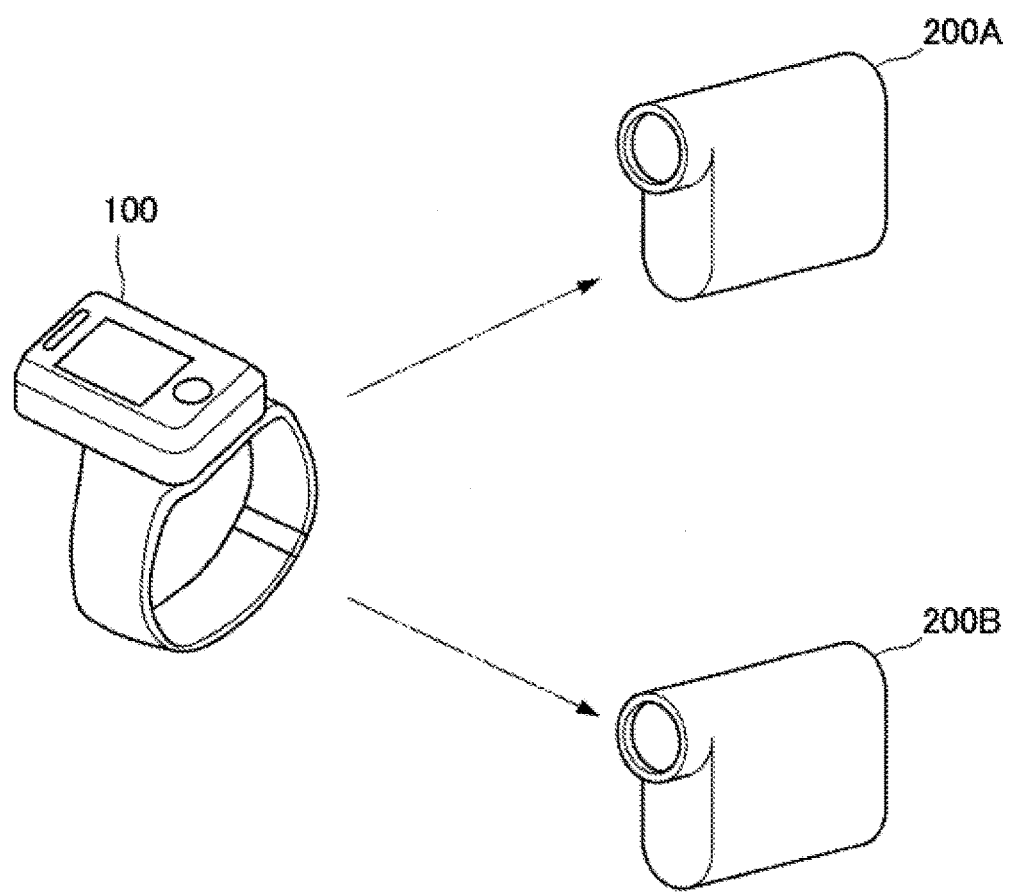

[Fig. 2]
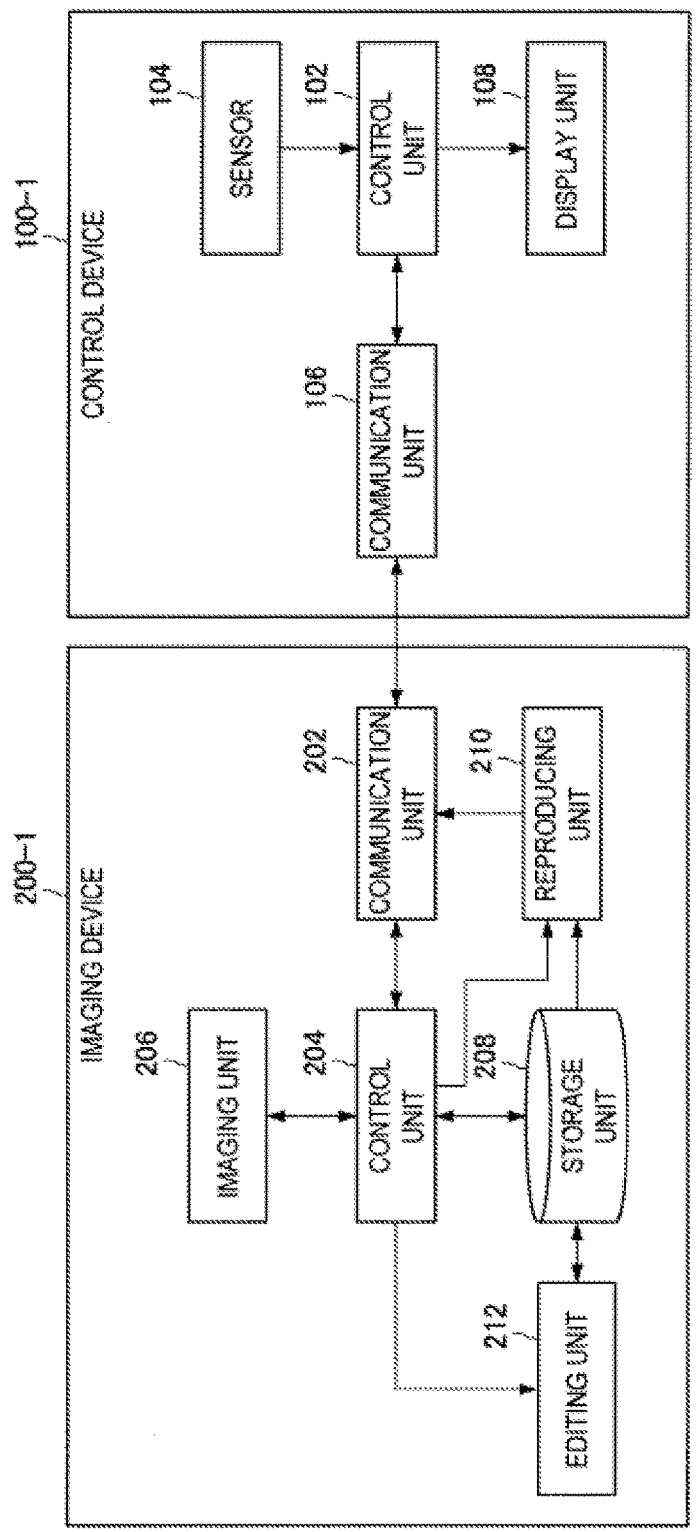

[Fig. 3]
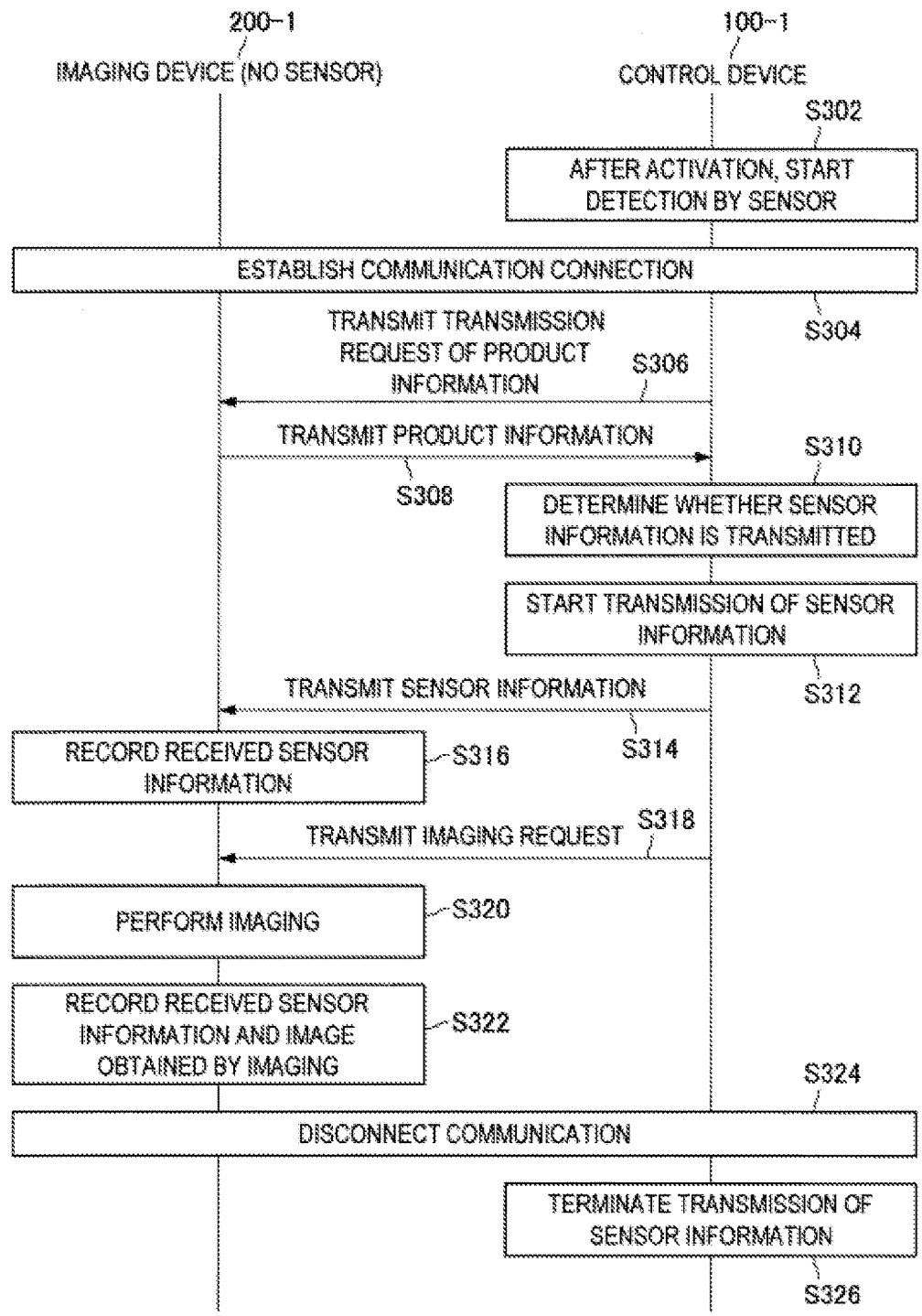

[Fig. 4]
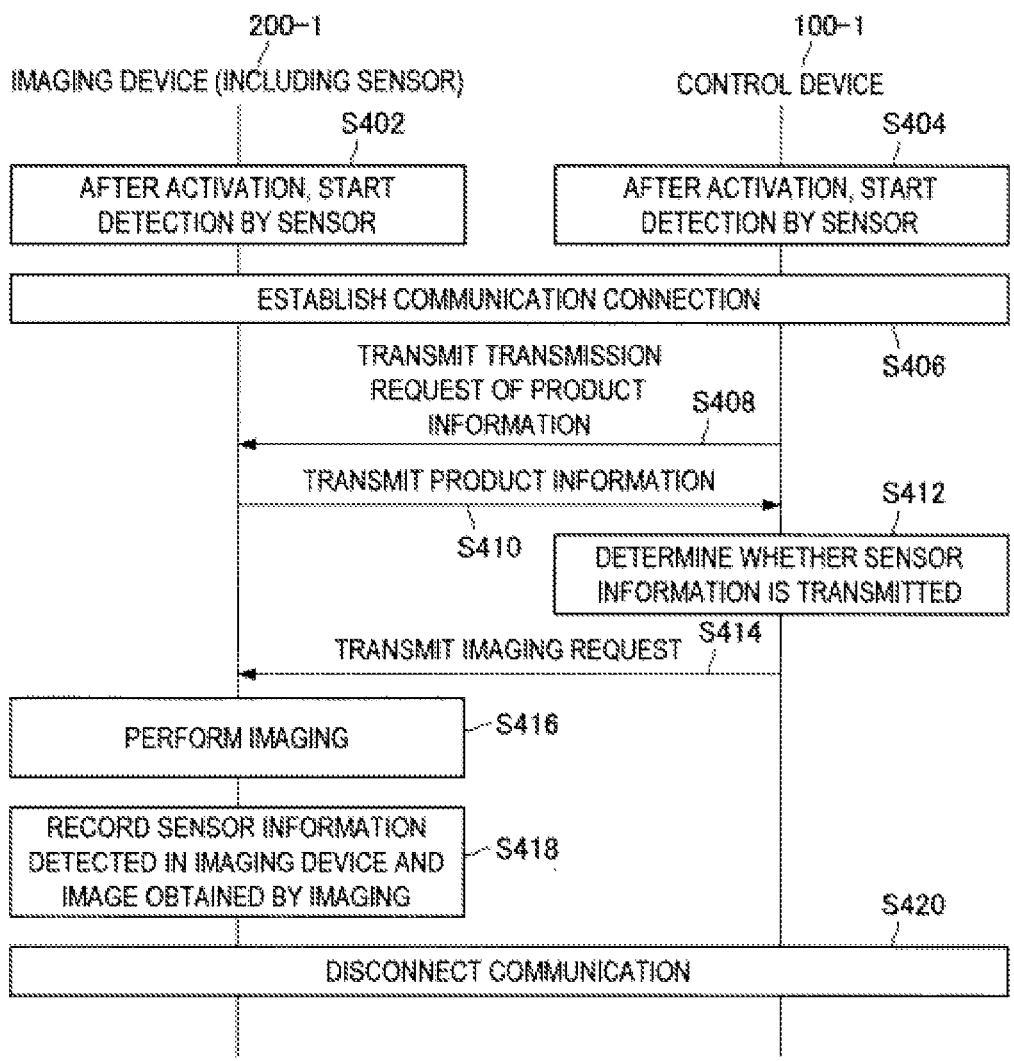

[Fig. 5]
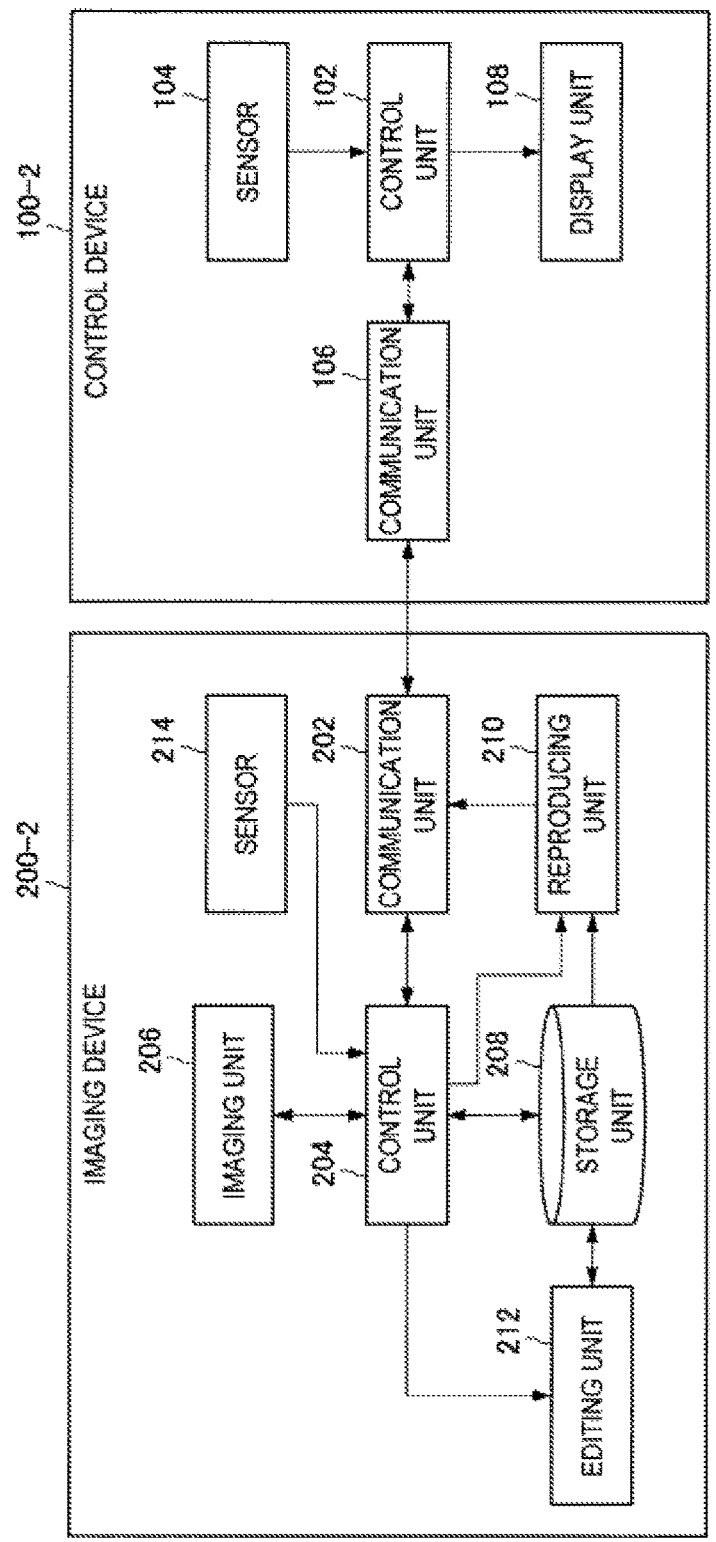

[Fig. 6]
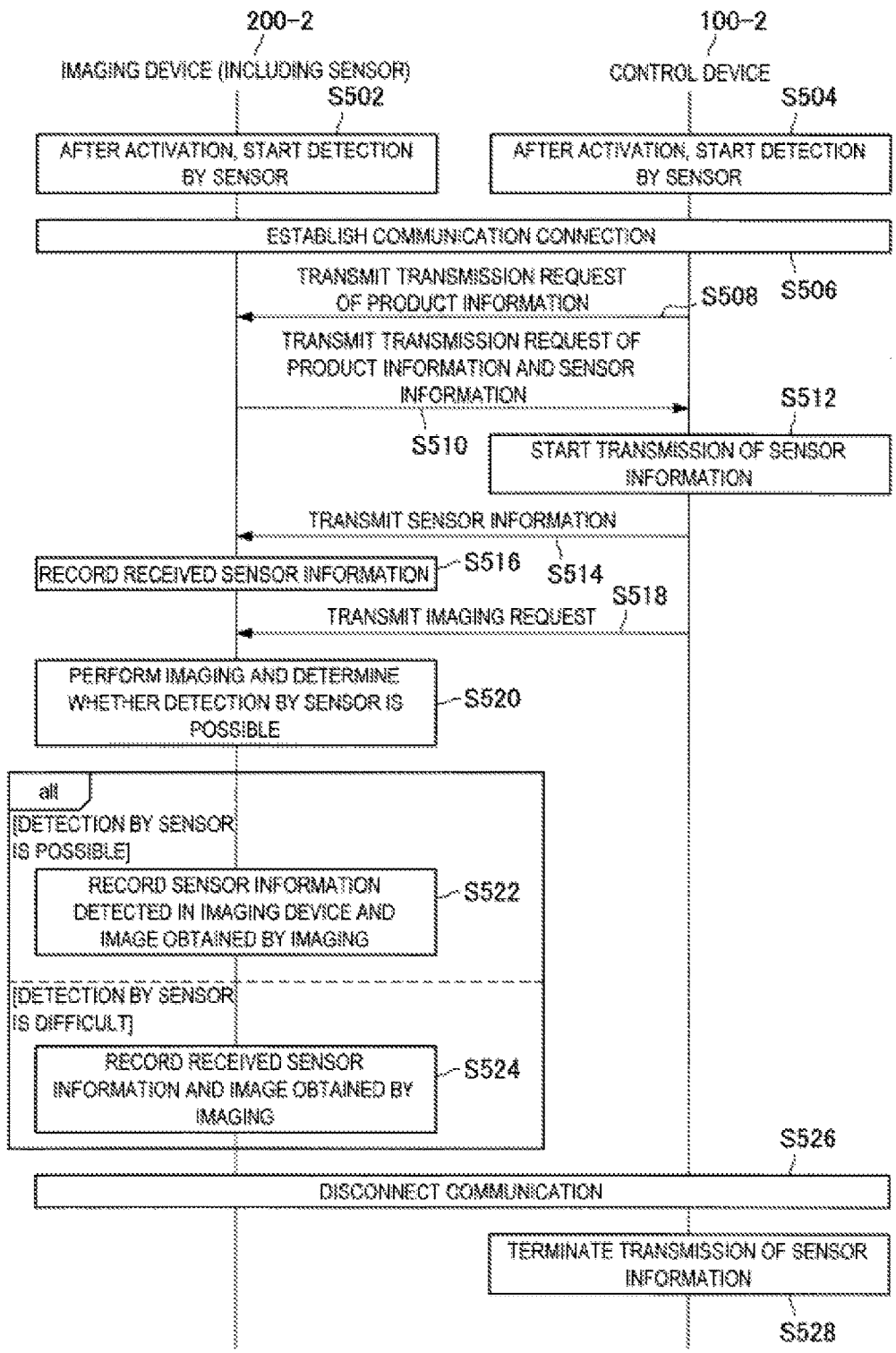

[Fig. 7]
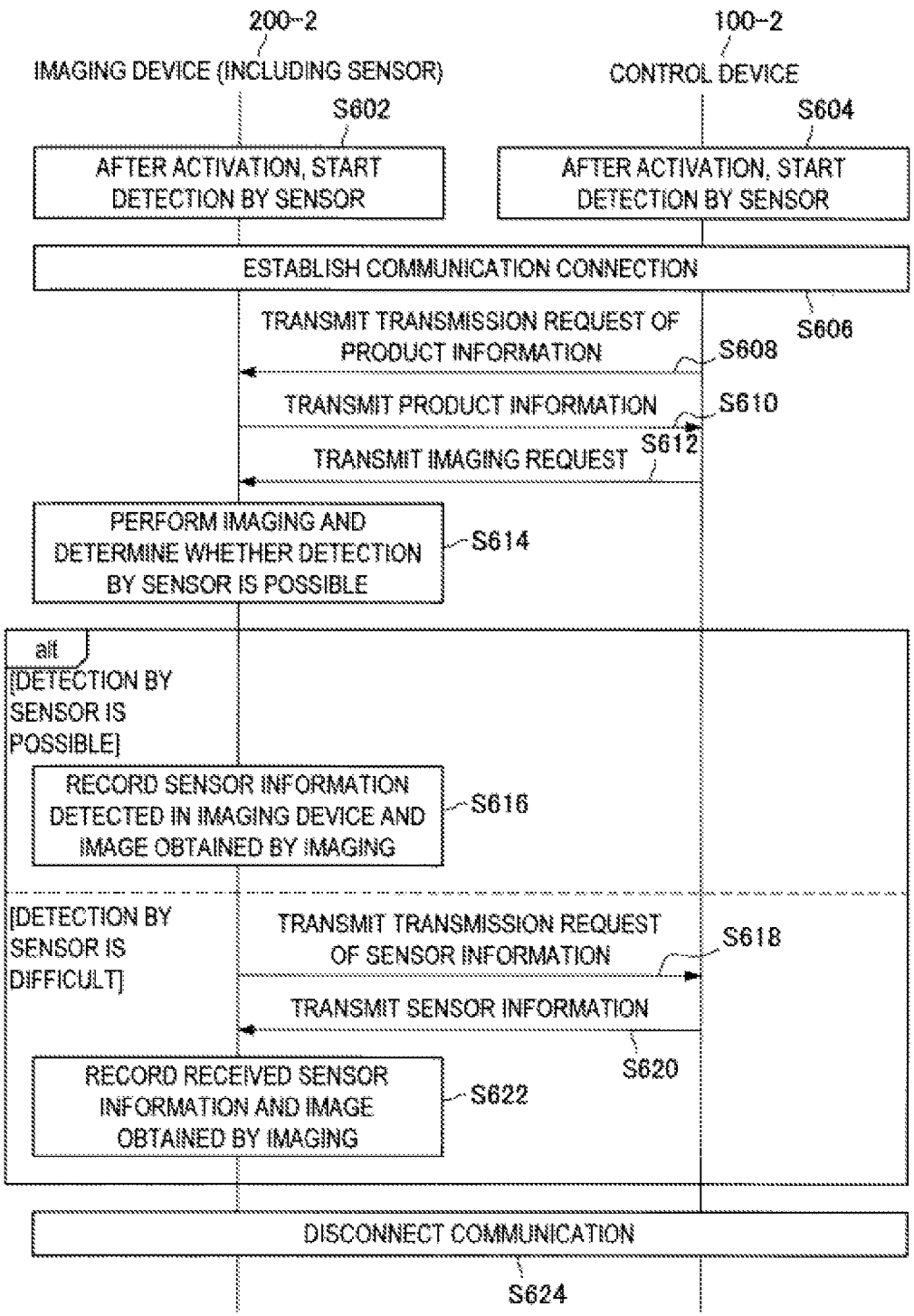

[Fig. 8]
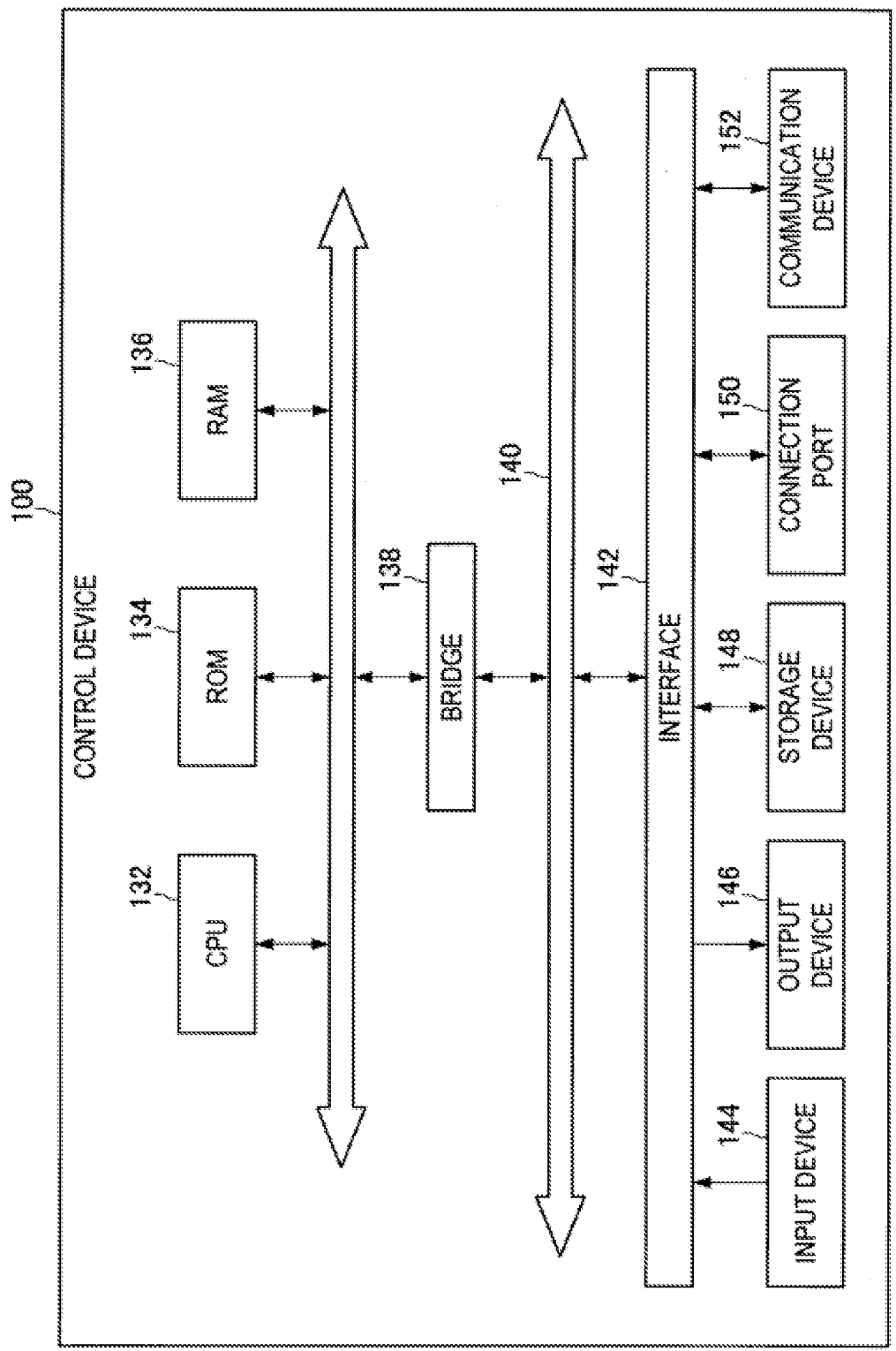

CONTROL DEVICE, CONTROL SYSTEM, CONTROL METHOD AND PROGRAM

CROSS REFERENCE TO RELATED APPLICATIONS

This application claims the benefit of Japanese Priority Patent Application JP 2014-168609 filed Aug. 21, 2014, the entire contents of which are incorporated herein by reference.

TECHNICAL FIELD

The present disclosure relates to a control device, a control system, a control method and a program.

BACKGROUND ART

In recent years, products in which communication technology is applied to recording devices having either or both of a sound recording function and an imaging function such as a video camera have been generally distributed. Operations of such recording devices may be controlled through communication from an external control device and the like.

For example, Patent Literature 1 discloses a technique in which one remote controller is used to control operations of a plurality of recording devices.

Also, Patent Literature 2 discloses a technique in which a plurality of imaging devices are communicatively connected to each other and another imaging device that has received a notification from one imaging device performs an operation based on the notification.

CITATION LIST

Patent Literature

[PTL 1]
  JP 2001-326845A
[PTL 2]
  JP 2012-119846A

SUMMARY

Technical Problem

In general, various sensors are provided in a recording device. However, providing the sensors in the recording device results in an increase in a cost of the recording device. In addition, due to operations of the sensors, power consumption of the recording device increases, and there is a possibility of power of a battery included in the recording device being depleted quickly.

Therefore, the present disclosure proposes a novel and improved control device, control system, control method and program capable of suppressing an increase of a cost of an external device or power consumption, and providing information detected by a sensor to an external device desiring the information.

Solution to Problem

In one exemplary aspect of the present disclosure, a remote camera control device comprises a communication circuit configured to transmit an operation request to an external camera device, and to selectively transmit a sensor information to the external camera device.

In another exemplary aspect of the present disclosure, a nontransitory computer-readable medium stores instructions that, when executed by a processor of a remote camera control device, cause the processor to perform transmitting, via a communication circuit, an operation request to an external camera device; and selectively transmitting, via the communication circuit, a sensor information to the external camera device.

In yet another exemplary aspect of the present disclosure, a method of performing a remote camera control comprises transmitting, via a communication circuit, an operation request to an external camera device; and selectively transmitting, via the communication circuit, a sensor information to the external camera device.

The above exemplary aspects of the present disclosure may further comprise a control circuit configured to generate the sensor information, to determine whether the external camera device includes a local sensor and, in a case that it is determined that the external device does not include the local sensor, to cause the communication circuit to transmit the sensor information to the external camera device.

Incidentally, effects described here are non-limiting. Effects achieved by the technology may be one or more of effects described in the present disclosure. It is to be understood that both the foregoing general description and the following detailed description are exemplary, and are provided to provide further explanation of the technology as claimed.

BRIEF DESCRIPTION OF DRAWINGS

FIG. 1 is a diagram illustrating an overview of a control system according to an embodiment of the present disclosure.

FIG. 2 is a block diagram schematically illustrating a functional configuration of a control system according to a first embodiment of the present disclosure.

FIG. 3 is a sequence diagram conceptually illustrating processing of a control system when an imaging device of a control system in the present embodiment has no sensor.

FIG. 4 is a sequence diagram conceptually illustrating processing of a control system when an imaging device of a control system in the present embodiment includes a sensor.

FIG. 5 is a block diagram schematically illustrating a functional configuration of a control system according to a second embodiment of the present disclosure.

FIG. 6 is a sequence diagram conceptually illustrating processing of a control system in the present embodiment.

FIG. 7 is a sequence diagram conceptually illustrating processing of a control system in a modification of the present embodiment.

FIG. 8 is an explanatory diagram illustrating a hardware configuration of a control device according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. Overview of control system according to embodiment of present disclosure
2. First embodiment of present disclosure (providing sensor information to imaging device having no sensor)
   2-1. Configuration of control system
   2-2. Processing of control system
   2-3. Modification
3. Second embodiment of present disclosure (providing sensor information to imaging device including sensor)
   3-1. Configuration of control system
   3-2. Processing of control system
   3-3. Modification
4. Hardware configuration of control device according to embodiment of present disclosure
5. Conclusion <1. Overview of Control System According to Embodiment of Present Disclosure>

First, an overview of a control system according to an embodiment of the present disclosure will be described with reference to FIG. 1. FIG. 1 is a diagram illustrating an overview of a control system according to an embodiment of the present disclosure.

The control system according to the embodiment of the present disclosure includes a control device 100 and an imaging device 200. The control device 100 is a portable mobile communication terminal that is moved by a user, and performs a communication connection with a plurality of imaging devices 200. Furthermore, the control device 100 has a function of performing operation control of the plurality of imaging devices 200 in parallel. Therefore, the control device 100 can control operations of the plurality of imaging devices 200 in parallel through communication. In addition, the imaging device 200 has portability and has a communication function, an imaging function and functions of reproducing and editing an image and the like. Therefore, the imaging device 200 may perform imaging by receiving an imaging request from the control device 100 and may reproduce or edit by receiving a reproducing request or an edit request from the control device 100.

For example, a communication connection between the control device 100 and imaging devices 200A and 200B is performed, and the control device 100 can request an operation such as imaging from each of the imaging devices 200A and 200B through communication as illustrated in FIG. 1. In addition, each of the imaging devices 200A and 200B performs imaging when the imaging request is received from the control device 100 through communication.

Here, when an image obtained by imaging in the imaging device 200 is recorded, information (hereinafter referred to as "sensor information") such as Global Positioning System (GPS) information that is detected by a sensor may be added to image data. In this case, in order to acquire the sensor information, a sensor is generally provided in the imaging device 200. However, due to installation of the sensor, a cost of the imaging device 200 increases, power consumption of the imaging device 200 increases, and thus there is a possibility of power of a battery being depleted quickly. Accordingly, in the control system of the embodiment of the present disclosure, the control device 100 includes a sensor. The control device 100 determines whether information detected by the sensor is transmitted to the imaging device 200 based on information on whether the sensor is in the imaging device 200 that is transmitted from the imaging device 200 or on information (hereinafter also referred to as "product information") designating a type of the imaging device 200.

For example, the control device 100 and the imaging device 200B illustrated in FIG. 1 include a GPS sensor. The imaging device 200A may be an imaging device having no GPS sensor. In this case, the control device 100 receives product information from each of the imaging devices 200A and 200B, and determines whether GPS information detected by the GPS sensor is transmitted based on each piece of product information. Then, the control device 100 transmits GPS information to only the imaging device having no GPS sensor 200A based on the determination result.

In this manner, in the control system according to the embodiment of the present disclosure, the control device 100 has a sensor, and the control device 100 determines whether information detected by the sensor is transmitted to the imaging device 200 based on the product information transmitted from the imaging device 200. Therefore, when it is determined from the product information whether the imaging device 200 includes a sensor, information can be provided to the imaging device 200 desiring the information detected by the sensor. Also, while a wrist watch type remote controller is illustrated as an example of the control device 100 in FIG. 1, the control device 100 may be a smartphone, a tablet terminal, a digital camera, a portable game console, or a mobile communication terminal such as a personal digital assistant (PDA). In addition, for convenience of description, the control device 100 and the imaging device 200 according to first and second embodiments are distinguished by suffixing a number corresponding to the embodiment to the reference number, for example, a control device 100-1 and a control device 100-2.

<2. First Embodiment of Present Disclosure (Providing Sensor Information to Imaging Device Having No Sensor)>

The overview of the control system according to the embodiment of the present disclosure has been described above. Next, a control system according to a first embodiment of the present disclosure will be described. In the control system according to the present embodiment, the control device 100-1 determines whether sensor information is transmitted to an imaging device having no sensor 200-1 based on product information received from the imaging device 200-1.

(2-1. Configuration of Control System)

First, a configuration of the control system according to the first embodiment of the present disclosure will be described with reference to FIG. 2. FIG. 2 is a block diagram schematically illustrating a functional configuration of the control system according to the first embodiment of the present disclosure.

As illustrated in FIG. 2, the control system according to the present embodiment includes the control device 100-1 and the imaging device 200-1 as an external device.

The control device 100-1 includes a control unit 102, a sensor 104, a communication unit 106 and a display unit 108.

The control unit 102 controls communication with the imaging device 200-1. Specifically, the control unit 102 determines whether information detected by the sensor 104 is transmitted to the imaging device 200-1 based on product information of the imaging device 200-1 transmitted from the imaging device 200-1. More specifically, the control unit 102 determines whether the sensor 104 is included in the imaging device 200-1 based on the received product information, and when it is determined that the imaging device 200-1 does not include the sensor 104, determines that sensor information is transmitted. More specifically, the product information includes information on whether the sensor is in the imaging device 200-1 and/or information designating a type of the imaging device 200-1 as external device information.

For example, the product information includes specification information such as an application programming interface (API) of the imaging device 200-1, and the control unit 102 determines whether the product information includes the API related to the sensor 104. When it is determined that the product information does not include the API related to the sensor 104, the control unit 102 determines that the imaging device 200-1 does not include the sensor 104 and determines that sensor information is transmitted to the imaging device 200-1.

Also, the product information may include component information of components constituting the imaging device 200-1 such as the sensor 104, and the control unit 102 may determine whether the product information includes component information of the sensor 104. When it is determined that the product information does not include component information of the sensor 104, the control unit 102 determines that the imaging device 200-1 does not include the sensor 104 and determines that sensor information is transmitted to the imaging device 200-1. In this case, by directly determining whether the sensor 104 is included, even when the same API or the like is implemented in the imaging device 200-1 regardless of whether the sensor 104 is included, it is possible to accurately determine whether the sensor 104 is included.

Further, the product information may include information designating the imaging device 200-1, for example, a model number, and the control unit 102 may determine whether there is the sensor 104 from the model number of the imaging device 200-1. For example, the model number of the imaging device 200-1, the above-described specification information or component information of the imaging device 200-1 designated by the model number may be stored in advance in a separately provided storage unit of the control device 100-1. Then, the control unit 102 acquires the specification information or the component information designated from the model number included in the received product information from the storage unit, and determines whether the sensor is present based on the acquired information as described above. In this case, since only the model number or the like is sufficient as the product information, a communication traffic volume can decrease and communication processing of the imaging device 200-1 can be simplified.

In this manner, the control unit 102 determines whether the imaging device 200-1 includes the sensor 104 based on the product information, and when it is determined that the imaging device 200-1 does not include the sensor 104, determines that information detected by the sensor 104 is transmitted. Therefore, when the imaging device 200-1 may desire the sensor information, the sensor information is transmitted to the imaging device 200-1, and thus efficient communication is possible.

In addition, the control unit 102 causes the communication unit 106 to transmit a transmission request of the product information to the imaging device 200-1 as first information. For example, when the transmission request of the product information from the imaging device 200-1 is generated and a communication connection with the imaging device 200-1 is established, for example, when pairing is performed, the control unit 102 causes the communication unit 106 to transmit the generated transmission request of the product information to the imaging device 200-1. Therefore, when transmission of the product information is explicitly requested, a process of determining whether there is a transmission request from communication content in the imaging device 200-1 or the like is unnecessary.

Accordingly, it is possible to simplify communication processing in the imaging device 200-1. Also, the transmission request of the product information may be transmitted after a communication connection is established, which is independent from establishment of the communication connection. In addition, when the transmission request of the product information is received, the imaging device 200-1 transmits product information of its own device to the control device 100-1 in response to the transmission request, details of which will be described below.

In addition, the control unit 102 causes the communication unit 106 to transmit the information detected by the sensor 104 to the imaging device 200-1 from which the product information is transmitted. For example, when the one control device 100-1 communicates with the plurality of imaging devices 200-1, the control unit 102 causes the communication unit 106 to transmit the sensor information to only the imaging device 200-1 from which the product information is transmitted using unicast communication. Therefore, when the sensor information is transmitted to only the imaging device 200-1 desiring the sensor information, it is possible to further decrease a communication traffic volume.

Also, when it is determined that the sensor information is transmitted, the control unit 102 may cause the communication unit 106 to transmit the sensor information to all of the plurality of imaging devices 200-1 using multicast or broadcast communication. Then, the imaging device 200-1 configured to receive sensor information selects whether the received sensor information is used. In this case, a process of designating a communication partner and computational resources are unnecessary. Therefore, it is possible to perform processing at high speeds and utilize computational resources additionally.

In addition, whenever information is detected by the sensor 104 after the product information is received, the control unit 102 causes the communication unit 106 to transmit the information detected by the sensor 104 to the imaging device 200-1. For example, when the product information is received and it is determined that the sensor information is transmitted to the imaging device 200-1, the control unit 102 transitions a state of the control device 100-1 to a transmission state of the sensor information. Then, when the sensor 104 detects new information, the control unit 102 causes the communication unit 106 to transmit the newly detected sensor information to the imaging device 200-1. Therefore, when transmission of the sensor information is determined once, the sensor information is transmitted without determination of whether transmission is performed. Therefore, it is possible to update information on the sensor included in the imaging device 200-1 as quickly as possible. Also, a transmission state of the sensor information is managed by a flag or the like, and when a transmission request of the sensor information is received, the control unit 102 turns the flag on.

In addition, the control unit 102 causes the communication unit 106 to transmit the operation request to the imaging device 200-1. For example, when a user operation, for example, an imaging instruction operation, is performed, the control unit 102 generates an imaging request of the user operation, and causes the communication unit 106 to transmit the generated imaging request to the imaging device 200-1.

The sensor 104 detects information on the control device 100-1 serving as a sensor information generating unit. Specifically, the sensor 104 detects information that is changed according to movement of the control device 100-1. For example, the sensor 104 may be a GPS sensor, an acceleration sensor, an angular velocity sensor, a geomagnetic sensor or the like, and may periodically detect information. Also, the sensor 104 is not limited to the above-described sensors, but may include a sensor configured to detect an external environment of the control device 100-1, for example, a temperature sensor, a humidity sensor, a pressure sensor, an audio sensor, an illuminance sensor or a biological sensor. Also, the sensor 104 may be an acquisition unit configured to acquire sensor information.

The communication unit 106 communicates with the imaging device 200-1. Specifically, the communication unit 106 transmits the transmission request of the product information, the sensor information and the operation request to the imaging device 200-1, and receives the product information from the imaging device 200-1. In addition, the communication unit 106 receives an image, a moving image or the like from the imaging device 200-1. For example, the communication unit 106 may perform radio communication using WiFi (registered trademark), Bluetooth (registered trademark), Zigbee (registered trademark) or the like.

The display unit 108 displays an image, a moving image or the like. Specifically, the display unit 108 displays an image, a moving image or the like that is received by the communication unit 106 from the imaging device 200-1. Also, the displayed image or the like may be an image or the like that is edited by image processing or the like of the control unit 102. Also, the control device 100-1 includes a separate audio output unit, and may output an audio based on received audio information together with the moving image or the like displayed on the display unit 108.

In addition, as illustrated in FIG. 2, the imaging device 200-1 includes a communication unit 202, a control unit 204, an imaging unit 206, a storage unit 208, a reproducing unit 210 and an editing unit 212.

The communication unit 202 communicates with the control device 100-1. Specifically, the communication unit 202 receives the transmission request of the product information, the sensor information and the operation request from the control device 100-1, and transmits the product information, the image, the moving image or the like to the control device 100-1.

The control unit 204 controls operations of the imaging device 200-1. Specifically, the control unit 204 controls communication with the control device 100-1. For example, when the transmission request of the product information is received by the communication unit 202 from the control device 100-1, the control unit 204 acquires the product information stored in the storage unit 208, and causes the communication unit 202 to transmit the product information to the control device 100-1.

In addition, the control unit 204 instructs the imaging unit 206 to image and causes the storage unit 208 to store an image obtained by imaging. For example, when the imaging request is received by the communication unit 202 from the control device 100-1, the control unit 204 instructs the imaging unit 206 to image. Then, the control unit 204 acquires an image obtained by imaging from the imaging unit 206 and causes the storage unit 208 to store the image as image data. In addition, the control unit 204 adds the sensor information received from the control device 100-1 to the image data.

For example, the image obtained by imaging is stored in a file format, for example, a JPEG corresponding to an image file format including metadata such as an exchangeable image file format (Exif), and the sensor information such as GPS information is stored as metadata of the image file. Also, when the sensor information is received, the control unit 204 causes the storage unit 208 to store the sensor information, and when the sensor information is used, the control unit 204 acquires the information from the storage unit 208. The sensor information may be overwritten upon reception or may be managed in a stack structure. In addition, information generated based on the sensor information may be stored.

In addition, the control unit 204 performs an operation instruction on the reproducing unit 210 and the editing unit 212. Specifically, the control unit 204 performs a reproduction instruction on the reproducing unit 210 and an edit instruction on the editing unit 212 based on the operation request from the control device 100-1.

Also, the control unit 204 may control operations of a sound collecting unit that is separately included in the imaging device 200-1. Specifically, the control unit 204 instructs the sound collecting unit to perform sound collection, and causes the storage unit 208 to store audio information obtained by sound collection of the sound collecting unit. For example, the audio information may be stored in combination with an image or may be stored independently from an image.

The imaging unit 206 performs imaging based on the instruction of the control unit 204. Specifically, the imaging unit 206 performs imaging of a subject in the vicinity of the imaging device 200-1 based on the instruction of the control unit 204. For example, when an imaging instruction is received from the control unit 204, the imaging unit 206 performs imaging and delivers an image obtained by imaging to the control unit 204. Also, the imaging unit 206 may include an imaging optical system such as a photographic lens configured to focus light and a zoom lens and a signal conversion element such as a charge coupled device (CCD) or a complementary metal oxide semiconductor (CMOS). In addition, the imaging unit 206 may not only obtain a still image by imaging but may also generate a moving image.

The storage unit 208 stores the product information of the imaging device 200-1, the image or the like obtained by imaging. For example, the product information may be a list of the specification information, the component information or the like of the imaging device 200-1. Also, the product information may be stored in advance, or may be additionally stored. In addition, the product information may be updated when a configuration of the imaging device 200-1, that is, a specification, a component or the like is added, deleted or changed.

The reproducing unit 210 reproduces an image that is recorded when the instruction of the control unit 204 is received. Specifically, the reproducing unit 210 reproduces the recorded image or the moving image based on the reproduction instruction of the control unit 204. For example, the reproduction instruction includes information designating an image or the like to be reproduced, and the reproducing unit 210 reproduces any image designated by the reproduction instruction among images that have or have not been edited by the editing unit 212.

Also, the information designating an image or the like to be reproduced is generated by an operation of the user selecting the reproduction target in the control device 100-1 and is received through the communication unit 202. In addition, the image to be reproduced or the like may be provided to the control device 100-1 or other devices, for example, a smartphone, a tablet terminal, a digital camera, a portable game console or a mobile communication terminal such as a PDA through the communication unit 202. Also, content to be reproduced may be an image, a moving image or the like edited by the editing unit 212.

The editing unit 212 edits the image or the like that is recorded when the instruction of the control unit 204 is received. Specifically, the editing unit 212 edits a recorded image, a moving image or the like based on an edit instruction of the control unit 204.

Here, the editing refers to processing in which feature parts are extracted from the image obtained by imaging of the imaging unit 206 or audio information obtained by sound collection of the sound collecting unit, and information on the extracted parts and the like is combined or processing in which a part having no feature is deleted from the image or the audio information. In addition, presence or absence of features is decided by the editing unit 212 based on sensor information received from the control device 100-1. Specifically, the editing unit 212 determines that there are features when an amount of change in a temporal change of received sensor information is greater than a threshold value. Also, decision of presence or absence of features may be performed in the control device 100-1. Specifically, presence or absence of features is decided by the control unit 102, and information indicating the presence or absence of features is transmitted to the imaging device 200-1 through the communication unit 106.

(2-2. Processing of Control System)

Next, processing of the control system in the present embodiment will be divided and described according whether the sensor 104 is included in the imaging device 200-1. First, a case in which the imaging device 200-1 does not include the sensor 104 will be described with reference to FIG. 3. FIG. 3 is a sequence diagram conceptually illustrating processing of the control system when the imaging device 200-1 of the control system in the present embodiment does not include the sensor 104.

First, the control device 100-1 is activated and then causes the sensor 104 to start detection (step S302). Specifically, the sensor 104 starts detection after an activation sequence of the control device 100-1 is completed or during an activation sequence. Also, detection by the sensor 104 may be started when it is determined that sensor information is transmitted in step S310 to be described below.

Next, the control device 100-1 and the imaging device 200-1 establish a communication connection (step S304). Specifically, the communication unit 202 of the imaging device 200-1 transmits a communication connection request to the communication unit 106 of the control device 100-1, and the communication unit 106 replies with a response for the received communication connection request to the communication unit 202, thereby establishing the connection. Also, the communication connection request may be transmitted from the communication unit 106, thereby establishing the communication connection.

Next, the control device 100-1 transmits the transmission request of the product information to the imaging device 200-1 (step S306). Specifically, after the communication connection with the imaging device 200-1 is established, the control unit 102 generates the transmission request of the product information from the imaging device 200-1, and causes the communication unit 106 to transmit the generated transmission request of the product information to the imaging device 200-1.

When the transmission request of the product information is received, the imaging device 200-1 transmits the product information to the control device 100-1 (step S308). Specifically, when the transmission request of the product information is received by the communication unit 202 from the control device 100-1, the control unit 204 acquires the product information stored in the storage unit 208, and causes the communication unit 202 to transmit the product information to the control device 100-1.

When the product information is received, the control device 100-1 determines whether the sensor information is transmitted (step S310). Specifically, the control unit 102 determines whether the sensor 104 is included in the imaging device 200-1 based on the received product information. In this case, the control unit 102 determines that the imaging device 200-1 does not include the sensor 104, and determines that the sensor information is transmitted.

Next, the control device 100-1 starts transmission of the sensor information (step S312). Specifically, the control unit 102 transitions a state of the control device 100-1 to the transmission state of the sensor information.

Then, the control device 100-1 periodically transmits the sensor information to the imaging device 200-1 (step S314). Specifically, the control unit 102 causes the communication unit 106 to transmit the information detected by the sensor 104 to the imaging device 200-1 from which the product information is transmitted. Also, whenever the sensor information is periodically detected while a state of the control device 100-1 is in the transmission state of the sensor information, the control unit 102 causes the communication unit 106 to transmit the sensor information to the imaging device 200-1.

When the sensor information is received, the imaging device 200-1 records the received sensor information (step S316). Specifically, when the sensor information is received by the communication unit 202, the control unit 204 causes the storage unit 208 to store the sensor information. Also, the sensor information stored in the storage unit 208 may be overwritten and updated upon reception.

Next, the control device 100-1 transmits the imaging request to the imaging device 200-1 (step S318). Specifically, when the user performs the imaging instruction operation, the control unit 102 generates an imaging request and causes the communication unit 106 to transmit the imaging request to the imaging device 200-1.

When the imaging request is received, the imaging device 200-1 performs imaging (step S320). Specifically, when the imaging request is received by the communication unit, the control unit 204 instructs the imaging unit 206 to image. Then, the imaging unit 206 performs imaging the vicinity of the imaging device 200-1 based on the instruction.

Next, the imaging device 200-1 records the received sensor information and the image obtained by imaging together (step S322). Specifically, the control unit 204 causes the storage unit 208 to store the image obtained by imaging of the imaging unit 206 as image data in which the received sensor information is included as header information.

Next, the control device 100-1 and the imaging device 200-1 disconnect communication (step S324). Specifically, when the user turns power of the imaging device 200-1 off, the communication unit 106 detects that communication with the imaging device 200-1 is disconnected.

Then, the control device 100-1 terminates transmission of the sensor information (step S326). Specifically, when disconnection of communication with the imaging device 200-1 is detected by the communication unit 106, the control unit 102 transitions a state of the control device 100-1 to a transmission stop state of the sensor information.

Next, a case in which the imaging device 200-1 includes the sensor 104 will be described with reference to FIG. 4. FIG. 4 is a sequence diagram conceptually illustrating processing of the control system when the imaging device 200-1 of the control system in the present embodiment includes the sensor 104. Also, processing substantially the same as the processing in FIG. 3 will not be described.

First, the control device 100-1 and the imaging device 200-1 are activated and cause the sensor to start detection (steps S402 and S404), and establish a communication connection (step S406).

Next, the control device 100-1 transmits the transmission request of the product information to the imaging device 200-1 (step S408), and when the transmission request of the product information is received, the imaging device 200-1 transmits the product information to the control device 100-1 (step S410).

When the product information is received, the control device 100-1 determines whether the sensor information is transmitted (step S412). Specifically, the control unit 102 determines whether the sensor 104 is included in the imaging device 200-1 based on the received product information. In this case, the control unit 102 determines that the imaging device 200-1 includes the sensor 104, and determines that the sensor information is not transmitted. Therefore, the sensor information is not transmitted from the control device 100-1 to the imaging device 200-1.

Next, the control device 100-1 transmits the imaging request to the imaging device 200-1 (step S414), and when the imaging request is received, the imaging device 200-1 performs imaging (step S416).

Next, the imaging device 200-1 records the sensor information detected in the imaging device 200-1 and the image obtained by imaging together (step S418). Specifically, the control unit 204 acquires the sensor information detected by the sensor included in the imaging device 200-1 when an image is acquired from the imaging unit 206. Then, the control unit 204 causes the storage unit 208 to store the acquired image as image data in which the sensor information is included as header information.

Then, the control device 100-1 and the imaging device 200-1 disconnect communication (step S420).

In this manner, according to the first embodiment of the present disclosure, the control system includes the control device 100-1 including the sensor 104 and configured to determine whether the information detected by the sensor 104 is transmitted to the imaging device 200-1 based on information on whether the sensor is in the imaging device 200-1 that is transmitted from the imaging device 200-1 or on information designating a type of the imaging device 200-1. Therefore, when it is determined from the product information whether the imaging device 200 includes the sensor, information can be provided to the imaging device 200 desiring the information detected by the sensor, and the sensor 104 may not be provided in the imaging device 200.

In addition, the control unit 102 causes the communication unit 106 to transmit first information to the imaging device 200-1, and the product information is transmitted according to transmission of the first information. Therefore, the control device 100-1 promotes the imaging device 200-1 in advance to transmit the product information, and determines whether the sensor information is transmitted based on the received product information. Therefore, the sensor information can be transmitted before the imaging device 200-1 desires the sensor information.

(2-3. Modification)

The first embodiment of the present disclosure has been described above. Also, the present embodiment is not limited to the above-described example. Hereinafter, the modification of the present embodiment will be described.

As the modification of the present embodiment, the first information transmitted by the control device 100-1 may be information on control of the imaging device 200-1 instead of the transmission request of the product information. Specifically, the control unit 102 causes the communication unit 106 to transmit the operation request to the imaging device 200-1 as the first information, and when the operation request is received, the control unit 204 causes the communication unit 202 to transmit the product information to the control device 100-1.

For example, when the user performs the imaging instruction operation, the control unit 102 generates an imaging request, and causes the communication unit 106 to transmit the generated imaging request to the imaging device 200-1.

When the imaging request is received by the communication unit 202, the control unit 204 acquires the product information stored in the storage unit 208 before the imaging unit 206 is instructed to image, and causes the communication unit 106 to transmit the acquired product information to the control device 100-1. Then, the control unit 204 instructs the imaging unit 206 to image, and the imaging unit 206 performs imaging.

When the product information is received by the communication unit 106, the control unit 102 determines whether the sensor information is transmitted based on the product information, and causes the communication unit 106 to transmit the sensor information to the imaging device 200-1.

When the sensor information is received by the communication unit 202, the control unit 204 causes the storage unit 208 to store the image obtained by imaging of the imaging unit 206 as image data in which the received sensor information is included as header information.

In this manner, according to the modification of the present embodiment, the first information transmitted by the control device 100-1 is information on control of the imaging device 200-1. Therefore, when the information on control of the imaging device 200-1 serves as the transmission request of the product information, the number of communications can be decreased, and power consumption due to communication can be decreased. Also, only when a specific operation request, for example, a request for an operation using information of the sensor 104 is received, the control unit 204 may cause the communication unit 106 to transmit the product information. In addition, the control unit 204 may instruct the imaging unit 206 to image after the sensor information is received.

<3. Second Embodiment of Present Disclosure (Providing Sensor Information to Imaging Device Including Sensor)>

The control system according to the first embodiment of the present disclosure has been described above. Next, the control system according to the second embodiment of the present disclosure will be described. In the control system according to the present embodiment, the imaging device 200-2 determines whether the transmission request of the sensor information is transmitted, and controls transmission of the transmission request of the sensor information to the control device 100-2 according to the determination result.

(3-1. Configuration of Control System)

First, a configuration of the control system according to the second embodiment of the present disclosure will be described with reference to FIG. 5. FIG. 5 is a block diagram schematically illustrating a functional configuration of the control system according to the second embodiment of the present disclosure.

As illustrated in FIG. 5, the imaging device 200-2 includes a sensor 214 in addition to the communication unit 202, the control unit 204, the imaging unit 206, the storage unit 208, the reproducing unit 210 and the editing unit 212. Also, since the sensor 214 is substantially the same as the sensor 104, redundant description will not be provided.

The control unit 204 causes the communication unit 106 to transmit the transmission request of the sensor information to the control device 100-1. Specifically, the control unit 204 generates the transmission request of the sensor information when the product information is transmitted, and causes the communication unit 106 to transmit the product information and the generated transmission request of the sensor information to the control device 100-1.

In addition, the control unit 204 determines whether information detected by any of the sensor 214 of the imaging device 200-2 and the sensor 104 of the control device 100-2 is used based on the detection result of the sensor 214. Specifically, the control unit 204 determines whether the sensor 214 is able to detect information based on the detection result of the sensor 214. Then, the control unit 204 determines the sensor, between the sensor 214 of the imaging device 200-2 and the sensor 104 of the control device 100-2, that detects the information that is used according to the determination result.

More specifically, the control unit 204 determines whether information is detected by the sensor 214 within a predetermined time, and when it is determined that no information is detected within the time, determines that detection by the sensor 214 is difficult. For example, when the sensor 214 is the GPS sensor and the imaging device 200-2 is under water or covered, detection of GPS information by the sensor 214 may be difficult, and a state in which GPS information is not detected may continue in such a case. Therefore, when a time for which GPS information is not detected is greater than a predetermined time, that is, detection of GPS information has timed out, the control unit 204 determines that detection of GPS information by the sensor 214 is difficult. Then, the control unit 204 determines that the information detected by the sensor 104 of the control device 100-2 is used.

Also, according to whether information detected by the sensor 214 matches information determined in advance, the control unit 204 may determine whether the sensor 214 is able to detect information. For example, the information determined in advance is information indicating erroneous detection such as an error code, and when information detected by the sensor 214 is the information indicating erroneous detection, the control unit 204 determines that detection by the sensor 214 is difficult.

Alternatively, the control unit 204 may determine whether the sensor 214 is able to detect information according to whether a value indicated by information detected by the sensor 214 is within a range of a predetermined value. For example, the range of the predetermined value is a range of a normal value that may be detected by the sensor 214. When a value indicated by information detected by the sensor 214 is outside the range of the value, the control unit 204 determines that detection by the sensor 214 is difficult.

In addition, when the image obtained by imaging is recorded, the control unit 204 uses the determined sensor information. For example, when it is determined that information detected by the sensor 214 is used, the control unit 204 causes the storage unit 208 to store the image obtained by imaging of the imaging unit 206 as image data in which information detected by the sensor 214 is included as header information. In addition, when it is determined that the sensor information received from the control device 100-2 is used, the control unit 204 causes the storage unit 208 to store the image obtained by imaging of the imaging unit 206 as image data in which the sensor information is included as header information.

In addition, a functional configuration of the control device 100-2 is substantially the same as that of the first embodiment, but operations of the control unit 102 are partially different.

When the transmission request of the sensor information is transmitted from the imaging device 200-2, the control unit 102 causes the communication unit 106 to transmit the information detected by the sensor 104 to the imaging device 200-2. Specifically, when the transmission request of the sensor information is received by the communication unit 106, the control unit 102 transitions a state of the control device 100-2 to the transmission state of the sensor information. Then, when the state is the transmission state of the sensor information, the control unit 102 causes the communication unit 106 to transmit the information detected by the sensor 104 to the imaging device 200-2.

(3-2. Processing of Control System)

Next, processing of the control system in the present embodiment will be described with reference to FIG. 6. FIG. 6 is a sequence diagram conceptually illustrating processing of the control system in the present embodiment. Also, processing that is substantially the same as the processing in the first embodiment illustrated in FIG. 3 or 4 will not be described.

First, the control device 100-2 and the imaging device 200-2 are activated and then cause the sensor to start detection (steps S502 and S504), and establish a communication connection (step S506).

Next, the control device 100-2 transmits the transmission request of the product information to the imaging device 200-2 (step S508).

When the transmission request of the product information is received, the imaging device 200-2 transmits the transmission request of the product information and the sensor information to the control device 100-2 (step S510). Specifically, when the transmission request of the product information is received by the communication unit 202, the control unit 204 acquires the product information stored in the storage unit 208 and generates the transmission request of the sensor information. Then, the control unit 204 causes the communication unit 202 to transmit the transmission request of the product information and the sensor information to the control device 100-2. Also, the transmission request of the sensor information may be transmitted independently from the product information.

When the transmission request of the sensor information is received, the control device 100-2 starts transmission of the sensor information (step S512). Specifically, when the transmission request of the sensor information is received by the communication unit 106, the control unit 102 transitions a state of the control device 100-2 to the transmission state of the sensor information.

Next, the control device 100-2 transmits the sensor information to the imaging device 200-2 (step S514), and when the sensor information is received, the imaging device 200-2 records the received sensor information (step S516).

Next, the control device 100-2 transmits the imaging request to the imaging device 200-2 (step S518), and when the imaging request is received, the imaging device 200-2 performs imaging and determines whether detection by the sensor 214 is possible (step S520). Specifically, when the imaging request is received by the communication unit 202, the control unit 204 instructs the imaging unit 206 to image. In addition, the control unit 204 determines whether information is detected by the sensor 214 within a predetermined time. When it is determined that the information is detected within the time, the control unit 204 determines that detection by the sensor 214 is possible. In addition, when it is determined that no information is detected within the time, the control unit 204 determines that detection by the sensor 214 is difficult. Also, processing of determining whether detection by the sensor 214 is possible may be periodically performed.

When it is determined that detection by the sensor 214 is possible, the imaging device 200-2 records the sensor information detected in the imaging device 200-2 and the image obtained by imaging together (step S522). Specifically, the control unit 204 causes the storage unit 208 to store the image obtained by imaging of the imaging unit 206 as image data in which information detected by the sensor 214 is included as header information.

When it is determined that detection by the sensor 214 is difficult, the imaging device 200-2 records the received sensor information and the image obtained by imaging (step S524). Specifically, the control unit 204 causes the storage unit 208 to store the image obtained by imaging of the imaging unit 206 as image data in which the sensor information received from the control device 100-2 is included as header information.

Next, the control device 100-2 and the imaging device 200-2 disconnect communication (step S526), and the control device 100-2 terminates transmission of the sensor information (step S528).

In this manner, according to the second embodiment of the present disclosure, the control system includes the imaging device 200-2 that is the imaging device 200-2 including the sensor 214 and configured to determine whether information detected by any of the sensor 214 of the imaging device 200-2 and the sensor 104 of the control device 100-2 is used based on the detection result of the sensor 214. Therefore, when it is difficult to acquire the sensor information in the imaging device 200-2, the sensor information is acquired from the control device 100-2. Therefore, processing using the sensor information continues, and it is possible to prevent inconvenience for the user due to interruption of the processing.

(3-3. Modification)

The second embodiment of the present disclosure has been described above. However, the present embodiment is not limited to the above-described example. Hereinafter, the modification of the present embodiment will be described.

As the modification of the present embodiment, the imaging device 200-2 may transmit the transmission request of the sensor information to the control device 100-2 according to the determination result of whether information detected by any of the sensor 214 and the sensor 104 is used. Specifically, when the transmission request of the product information is received, the control unit 204 causes the communication unit 202 to transmit only the product information without transmitting the transmission request of the sensor information. Then, when it is determined that the information detected by the sensor 104 of the control device 100-2 is used, the control unit 204 causes the communication unit 202 to transmit the transmission request of the sensor information to the control device 100-2. Processing of the control system according to the present modification will be described in detail with reference to FIG. 7. FIG. 7 is a sequence diagram conceptually illustrating processing of the control system in the modification of the present embodiment. Also, detailed description of processing that is substantially the same as the processing of the first and second embodiments will not be provided.

First, the control device 100-2 and the imaging device 200-2 are activated and cause the sensor to start detection (steps S602 and S604), and establish a communication connection (step S606).

Next, the control device 100-2 transmits the transmission request of the product information to the imaging device 200-2 (step S608), and when the transmission request of the product information is received, the imaging device 200-2 transmits the product information to the control device 100-2 (step S610). Also, in step S610, the control unit 204 causes the communication unit 202 to transmit only the product information.

Next, the control device 100-2 transmits the imaging request to the imaging device 200-2 (step S612), and when the imaging request is received, the imaging device 200-2 performs imaging and determines whether detection by the sensor 214 is possible (step S614).

When it is determined that detection by the sensor 214 is possible, the imaging device 200-2 records the sensor information detected in the imaging device 200-2 and the image obtained by imaging together (step S616).

When it is determined that detection by the sensor 214 is difficult, the imaging device 200-2 transmits the transmission request of the sensor information to the control device 100-2 (step S618), and when the transmission request of the sensor information is received, the control device 100-2 transmits the sensor information to the imaging device 200-2 (step S620). Specifically, when it is determined that detection by the sensor 214 is difficult, the control unit 204 determines that the sensor information of the sensor 104 is used, and generates the transmission request of the sensor information. Then, the control unit 204 causes the communication unit 202 to transmit the generated transmission request of the sensor information to the control device 100-2. On the other hand, when the transmission request of the sensor information is received, the control unit 102 causes the communication unit 106 to transmit the sensor information to the imaging device 200-2 in response to the transmission request of the sensor information without transition of the state of the control device 100-2.

When the sensor information is received, the imaging device 200-2 records the received sensor information and the image obtained by imaging together (step S622).

In this manner, according to the modification of the present embodiment, the imaging device 200-2 transmits the transmission request of the sensor information to the control device 100-2 according to the determination result of whether information detected by any of the sensor 214 and the sensor 104 is used. Therefore, communication related to the sensor information is performed only in a timing at which the sensor information of the control device 100-2 is desired, and thus it is possible to decrease a communication traffic volume and power consumption due to communication processing.

<4. Hardware Configuration of Control Device According to Embodiment of the Present Disclosure>

The embodiments of the present disclosure have been described above. The processes of the control device 100 described above are realized through cooperation of software and the hardware of the control device 100 to be described below.

FIG. 8 is an explanatory diagram illustrating a hardware configuration of the control device 100 according to an embodiment of the present disclosure. As illustrated in FIG. 8, the control device 100 includes a central processing unit (CPU) 132, a read-only memory (ROM) 134, a random access memory (RAM) 136, a bridge 138, a bus 140, an interface 142, an input device 144, an output device 146, a storage device 148, a connection port 150, and a communication device 152.

The CPU 132 functions as an arithmetic processing unit and a control unit and realizes an operation of the control unit 102 in the control device 100 in cooperation with various programs. The CPU 132 may be a microprocessor. The ROM 134 stores programs, arithmetic parameters, and the like used by the CPU 132. The RAM 136 temporarily stores programs used in execution of the CPU 132 or parameters or the like properly changed in execution thereof. A part of the storage unit in the control device 100 is realized by the ROM 134 and the RAM 136. The CPU 132, the ROM 134, and the RAM 136 are mutually connected by an internal bus configured by a CPU bus or the like.

The input device 144 is configured to include an input unit, such as a mouse, a keyboard, a touch panel, a button, a microphone, a switch, and a lever, used for the user to input information, a sensor 104, and an input control circuit generating an input signal based on an input by the user or content detected by the sensor 104 and outputting the input signal to the CPU 132. The user of the control device 100 can input various kinds of data or can give an instruction of a processing operation to the control device 100 by manipulating the input device 144.

The output device 146 outputs information to, for example, a device such as a liquid crystal display (LCD) device, an organic light emitting diode (OLED) device, or a lamp. The output device 146 may output an audio of a speaker, a headphone, and the like.

The storage device 148 is a device that stores data. The storage device 148 may include a storage medium, a recording device recording data on a storage medium, a reading device reading data from a storage medium, or a deletion device deleting data recorded on a storage medium. The storage device 148 stores programs executed by the CPU 132 or various kinds of data.

The connection port 150 is, for example, a bus connected to an external information processing process or a peripheral device of the control device 100. The connection port 150 may be a Universal Serial Bus (USB).

The communication device 152 is an example of the communication unit 106 of the control device 100 and is, for example, a communication interface configured by a communication device connected to a network. The communication device 152 may be a device corresponding to infrared communication, may be a communication device corresponding to a wireless local area network (LAN), may be a communication device corresponding to Long Term Evolution (LTE), or may be a wired communication device performing communication in a wired manner.

<5. Conclusion>

As described above, according to the first embodiment of the present disclosure, when it is determined from the product information whether the imaging device 200 includes the sensor, information can be provided to the imaging device 200 desiring the information detected by the sensor, and the sensor 104 may not be provided in the imaging device 200. In addition, according to the second embodiment of the present disclosure, when it is difficult to acquire the sensor information in the imaging device 200-2, the sensor information is acquired from the control device 100-2. Therefore, processing using the sensor information continues, and it is possible to prevent inconvenience for the user due to interruption of the processing.

It should be understood by those skilled in the art that various modifications, combinations, sub-combinations and alterations may occur depending on design requirements and other factors insofar as they are within the scope of the appended claims or the equivalents thereof For example, in the above embodiment, the example in which the transmission request of the product information is transmitted during or after establishment of a communication connection between the control device 100 and the imaging device 200 has been described, but the present technology is not limited to the example. For example, the control device 100 may transmit the transmission request of the product information according to a change of a state of the imaging device 200. Specifically, the control unit 102 may perform polling on the imaging device 200 through the communication unit 106, and query a state of the imaging device 200. Then, when a state of the imaging device 200 is changed, the control unit 102 causes the communication unit 106 to transmit the transmission request of the product information. In this case, when the product information is changed by a state of the imaging device 200, it is possible to respond to the change of the product information.

In addition, while the first embodiment in which transmission of the sensor information is determined based on the product information and the second embodiment in which the sensor information is transmitted according to the transmission request of the sensor information have been described above, the first and second embodiments may be combined. Specifically, when the product information is received, the control unit 102 causes the communication unit 106 to transmit the sensor information after it is determined whether the sensor information is transmitted based on the product information, and when the transmission request of the sensor information is received, causes the communication unit 106 to transmit the sensor information in response to the transmission request. In this case, when the imaging devices 200 with and without the sensors are mixed, regardless of this, it is possible to provide the sensor information to the imaging device 200 desiring the sensor information.

In addition, in the above embodiment, while the control unit 102 causes the communication unit 106 to transmit the information detected by the sensor 104, the control unit 102 may cause the communication unit 106 to transmit information obtained by changing the information detected by the sensor 104. Specifically, the control unit 102 processes the information detected by the sensor 104 and causes the communication unit 106 to transmit the processed information. For example, the control unit 102 may generate new position information that is obtained by adding relative position information between the control device 100 and the imaging device 200 to GPS information detected by the GPS sensor, and cause the communication unit 106 to transmit the generated position information. In this case, since information more useful than the information detected by the sensor 104 may be provided, it is possible to increase a value of information stored in the imaging device 200.

In addition, in the first embodiment, whenever information is detected by the sensor 104, the control unit 102 causes the communication unit 106 to transmit the sensor information, and the control unit 102 may determine whether the sensor information is transmitted according to a state of the control device 100 or the imaging device 200. Specifically, when the control device 100 or the imaging device 200 is in a state in which processing having a higher priority than communication of the sensor information is performed, the control unit 102 determines that transmission of the sensor information is stopped or is postponed. In this case, it is possible to perform transmission of the sensor information without disturbing performing of other processing and without increasing a processing load due to processing concurrent with other processing.

Further, the control unit 102 may cause the communication unit 106 to transmit the sensor information at a frequency lower than a detection frequency of the sensor 104. For example, whenever detection of the sensor 104 is performed four times, the control unit 102 causes the communication unit 106 to transmit the sensor information once. In this case, while the sensor information is transmitted, it is possible to decrease a communication traffic volume.

In addition, in the second embodiment, the control unit 204 determines whether detection by the sensor 214 is possible when the imaging request is received. However, the control unit 204 may determine whether detection by the sensor 214 is possible when the imaging instruction operation is performed in the imaging device 200. Specifically, when the imaging device 200 includes a separate operating unit and the user performs the imaging instruction operation through the operating unit, the control unit 204 instructs the imaging unit 206 to image and determines whether detection by the sensor 214 is possible. In this case, even when no imaging request is transmitted from the control device 100, processing related to imaging is performed in the imaging device 200. Therefore, it is possible to increase convenience for the user.

In addition, in the above embodiment, after the control device 100 or the imaging device 200 is activated, the sensor starts detection, but the sensor may start detection based on an explicit instruction. For example, when the control unit 102 performs a predetermined user operation, the control device 100 may instruct detection start of the sensor 104.

In addition, in the above embodiment, the example in which the imaging device 200 includes the editing unit 212 has been described, but the imaging device 200 may be a device in which the editing unit 212 is not included.

The effects described in the specification are just explanatory or exemplary effects, and are not limiting. That is, the technology according to the present disclosure can exhibit other effects that are apparent to a person skilled in the art from the descriptions in the specification, along with the above effects or instead of the above effects.

It is to be noted that the present technology is allowed to have the following configurations.

(1) A remote camera control device comprising: a communication circuit configured to transmit an operation request to an external camera device, and to selectively transmit a sensor information to the external camera device.

(2) The remote camera control device according to (1), further comprising: a control circuit configured to generate the sensor information, to determine whether the external camera device includes a local sensor and, in a case that it is determined that the external device does not include the local sensor, to cause the communication circuit to transmit the sensor information to the external camera device.

(3) The remote camera control device according to (1) or (2), wherein the control circuit is configured: in a case that it is determined that the external camera device includes the local sensor, to not cause the communication circuit to transmit the sensor information to the external camera device.

(4) The remote camera control device according to (1) or (2), wherein the control circuit is configured: in a case that it is determined that the external camera device includes the local sensor, to determine whether detection by the local sensor is difficult; and in a case that it is determined that detection by the local sensor is difficult, to cause the communication circuit to transmit the sensor information to the external camera device.

(5) The remote camera control device according to (4), wherein the control circuit is configured: in a case that it is determined that detection by the local sensor is not difficult, to not cause the communication circuit to transmit the sensor information to the external camera device.

(6) The remote camera control device according to (4) or (5), wherein the control circuit is configured: to determine whether an operation of the local sensor has timed out; and in a case that it is determined that the operation of the local sensor has timed out, to determine that detection by the local sensor is difficult.

(7) The remote camera control device according any one of (4) to (6), wherein the control circuit is configured: to determine whether a local sensor information includes an error code; and in case that it is determined that the local sensor information includes the error code, to determine that detection by the local sensor is difficult.

(8) The remote camera control device any one of (4) to (7), wherein the control circuit is configured: to determine whether a local sensor information is within a range of a predetermined value; and in case that it is determined that the local sensor information is not within the range of the predetermined value, to determine that detection by the local sensor is difficult.

(9) The remote camera control device according to any one of (2) to (8), wherein the control circuit is configured: to determine a processing state of the remote camera control device or the external camera device; and in a case that it is determined that the remote camera control device or the external camera device is performing a processing having a higher priority than communication of the sensor information, to cause the communication circuit to postpone transmission of the sensor information to the external camera device.

(10) The remote camera control device according to any one of (2) to (9), wherein the control circuit is configured: to repeatedly determine whether the external camera device includes the local sensor at a detection frequency; and to repeatedly cause the communication circuit to transmit the sensor information to the external camera device at a transmission frequency, wherein the transmission frequency is lower than the detection frequency.

(11) The remote camera control device according to any one of (2) to (10), wherein the control circuit is configured to determine whether the external camera device includes the local sensor based on a specification information or a product information originating from the external camera device.

(12) The remote camera control device according to any one of (1) to (11), wherein the operation request is an imaging request.

(13) The remote camera control device according to any one of (1) to (12), wherein the operation request is a request to change a setting of the external camera device.

(14) The remote camera control device according to (13), wherein the setting of the external camera device is a capture mode setting, a framerate setting, or a recording format setting.

(15) The remote camera control device according to any one of (1) to (14), further comprising a sensor, wherein the sensor includes a Global Positioning System sensor, an acceleration sensor, an angular velocity sensor, a geomagnetic sensor, an external environment sensor, a biological sensor, an acquisition unit, or a combination thereof

(16) The remote camera control device according to any one of (1) to (15), wherein the communication circuit is configured to transmit using a short-range wireless communication.

(17) The remote camera control device according to (16), wherein the short-range wireless communication is a WiFi communication, a Bluetooth communication, a Zigbee communication, or a radio communication.

(18) The remote camera control device according to any one of (1) to (17), wherein the communication circuit is configured to communicate with a plurality of external camera devices in parallel.

(19) A nontransitory computer-readable medium storing instructions that, when executed by a processor of a remote camera control device, cause the processor to perform: transmitting, via a communication circuit, an operation request to an external camera device; and selectively transmitting, via the communication circuit, a sensor information to the external camera device.

(20) A method of performing a remote camera control, comprising: transmitting, via a communication circuit, an operation request to an external camera device; and selectively transmitting, via the communication circuit, a sensor information to the external camera device.

REFERENCE SIGNS LIST 100 control device
102 control unit
104 sensor
106 communication unit
108 display unit
200 imaging device
202 communication unit
204 control unit
206 imaging unit
208 storage unit
210 reproducing unit
212 editing unit
214 sensor

The invention claimed is:

1. A remote camera control device comprising:
a communication circuit configured to transmit an operation request to an external camera device, and to selectively transmit a sensor information to the external camera device; and
a control circuit configured to access a product information of the external camera device, and in a case that the external device does not include a local sensor, cause the communication circuit to transmit the sensor information to the external camera device.

2. The remote camera control device according to claim 1, wherein the control circuit is configured:
in a case that it is determined that the external camera device includes the local sensor, to not cause the communication circuit to transmit the sensor information to the external camera device.

3. The remote camera control device according to claim 1, wherein the control circuit is configured:
in a case that it is determined that the external camera device includes the local sensor, to determine whether detection by the local sensor is difficult; and
in a case that it is determined that detection by the local sensor is difficult, to cause the communication circuit to transmit the sensor information to the external camera device.

4. The remote camera control device according to claim 3, wherein the control circuit is configured:
in a case that it is determined that detection by the local sensor is not difficult, to not cause the communication circuit to transmit the sensor information to the external camera device.

5. The remote camera control device according to claim 3, wherein the control circuit is configured:
to determine whether an operation of the local sensor has timed out; and
in a case that it is determined that the operation of the local sensor has timed out, to determine that detection by the local sensor is difficult.

6. The remote camera control device according to claim 3, wherein the control circuit is configured:
to determine whether a local sensor information includes an error code; and
in case that it is determined that the local sensor information includes the error code, to determine that detection by the local sensor is difficult.

7. The remote camera control device according to claim 3, wherein the control circuit is configured:
to determine whether a local sensor information is within a range of a predetermined value; and
in case that it is determined that the local sensor information is not within the range of the predetermined value, to determine that detection by the local sensor is difficult.

8. The remote camera control device according to claim 1, wherein the control circuit is configured:
to determine a processing state of the remote camera control device or the external camera device; and
in a case that it is determined that the remote camera control device or the external camera device is performing a processing having a higher priority than communication of the sensor information, to cause the communication circuit to postpone transmission of the sensor information to the external camera device.

9. The remote camera control device according to claim 1, wherein the control circuit is configured:
to repeatedly determine whether the external camera device includes the local sensor at a detection frequency; and
to repeatedly cause the communication circuit to transmit the sensor information to the external camera device at a transmission frequency,
wherein the transmission frequency is lower than the detection frequency.

10. The remote camera control device according to claim 1, wherein the product information originates from the external camera device.

11. The remote camera control device according to claim 1, wherein the operation request is an imaging request.

12. The remote camera control device according to claim 1, wherein the operation request is a request to change a setting of the external camera device.

13. The remote camera control device according to claim 12, wherein the setting of the external camera device is a capture mode setting, a framerate setting, or a recording format setting.

14. The remote camera control device according to claim 1, further comprising a sensor configured to generate the sensor information, wherein the sensor includes a Global Positioning System sensor, an acceleration sensor, an angular velocity sensor, a geomagnetic sensor, an external environment sensor, a biological sensor, an acquisition unit, or a combination thereof.

15. The remote camera control device according to claim 1, wherein the communication circuit is configured to transmit using a short-range wireless communication.

16. The remote camera control device according to claim 15, wherein the short-range wireless communication is a WiFi communication, a Bluetooth communication, a Zigbee communication, or a radio communication.

17. The remote camera control device according to claim 1, wherein the communication circuit is configured to communicate with a plurality of external camera devices in parallel.

18. A non-transitory computer-readable medium storing instructions that, when executed by a processor of a remote camera control device, cause the processor to perform operations comprising:

transmitting, via a communication circuit, an operation request to an external camera device;
selectively transmitting, via the communication circuit, a sensor information to the external camera device;
accessing, via a control circuit, a product information of the external camera device; and
in a case that the external device does not include a local sensor, causing the communication circuit to transmit the sensor information to the external camera device.

19. A method of performing a remote camera control, comprising:

transmitting, via a communication circuit, an operation request to an external camera device;
selectively transmitting, via the communication circuit, a sensor information to the external camera device;
accessing, via a control circuit, a product information of the external camera device; and
in a case that the external device does not include a local sensor, causing the communication circuit to transmit the sensor information to the external camera device.

* * * * *